United States Patent
Mallick et al.

(10) Patent No.: US 9,043,756 B2
(45) Date of Patent: May 26, 2015

(54) COMPOUND VERSIONING AND IDENTIFICATION SCHEME FOR COMPOSITE APPLICATION DEVELOPMENT

(71) Applicants: Sudeep Mallick, Bangalore (IN); Deepti Parachuri, Hyderabad (IN)

(72) Inventors: Sudeep Mallick, Bangalore (IN); Deepti Parachuri, Hyderabad (IN)

(73) Assignee: INFOSYS LIMITED (IN)

( * ) Notice: Subject to any disclaimer, the term of this patent is extended or adjusted under 35 U.S.C. 154(b) by 0 days.

(21) Appl. No.: 14/149,032

(22) Filed: Jan. 7, 2014

(65) Prior Publication Data

US 2014/0123106 A1     May 1, 2014

Related U.S. Application Data

(62) Division of application No. 12/634,751, filed on Dec. 10, 2009, now Pat. No. 8,656,354.

(30) Foreign Application Priority Data

Dec. 11, 2008   (IN) .......................... 3108/CHE/2008

(51) Int. Cl.
*G06F 9/44*     (2006.01)
(52) U.S. Cl.
CPC ........................................ *G06F 8/71* (2013.01)
(58) Field of Classification Search
USPC ........................................................ 717/121
See application file for complete search history.

(56) References Cited

U.S. PATENT DOCUMENTS

6,681,371 B1   1/2004   Devanbu
6,971,093 B1   11/2005  Spring

*Primary Examiner* — Chun-Kuan Lee
(74) *Attorney, Agent, or Firm* — Cantor Colburn LLP (57) ABSTRACT

The present invention provides a method, a system and a computer program product for defining a version identifier of a service component. The method includes determining various specification levels corresponding to the service component. Thereafter, the determined specification levels are integrated according to a predefined hierarchy to obtain the version identifier of the service component. The present invention also enables the identification of the service components. The service components are identified from one or more service components on the basis of one or more user requirements.

8 Claims, 4 Drawing Sheets

COMPOUND VERSIONING AND IDENTIFICATION SCHEME FOR COMPOSITE APPLICATION DEVELOPMENT

CROSS REFERENCE TO RELATED APPLICATIONS

This application is a divisional of U.S. patent application Ser. No. 12/634,751, filed on 10 Dec. 2009 which claimed priority to Indian Patent Application Number 3108/CHE/2008, filed on 11 Dec. 2008, the entire contents of all of said applications being incorporated herein by reference.

BACKGROUND

The present invention relates to the field of composite application development. More specifically, the present invention relates to versioning of service components for composite application development.

In distributed computing, source code is written, deployed and executed by various teams operating in various geographies using different software development and execution environments. The source code, also known as a component, is owned and managed by the developers of the source code. These components are used to develop large-scale business applications using mutually decided communication protocol that is either standard or proprietary. This new paradigm of distributed computing resulted in the introduction of the concept of composite or hybrid applications.

A composite application is built by integrating various pre-built service components using standardized service interfaces. The use of pre-built service components reduces the effort in designing, coding and testing new service components. Therefore, the success of the composite application development is based on the availability of rich catalog of pre-built configurable components. Further, the concept of Service Oriented Architecture (SOA) is used for composite application development. In SOA, the software components are exposed as service components. Service components include configurable software components, the services they expose and the references they make to other service components. The service components include declarations about their promise regarding adherence to publically available service contracts containing service policies.

To develop a composite application, a catalog of pre-built service components and service interfaces is used to select the desired service components and service interfaces. Thereafter, the selected service components and service interfaces are integrated based on their mutual compatible service interfaces. Further, Service Component Architecture (SCA) is an open standard that enables the integration of various service components using various protocols for developing composite applications.

The service components built for developing composite applications have various service implementations that are provided at different Qualify of Service (QoS) and maturity levels. Further, these components include service interfaces that exist in multiple versions. The service implementations are compatible with various versions of the service interfaces. Furthermore, the same service interface denotes different semantics depending on the business context. Therefore, there are multiple service implementations corresponding to various business contexts that employ the same service interface. In addition, the service implementation can be configured with different properties. Therefore, a software component built for the development of a service component results in multiple service components based on the service implementation configurations.

The composite application runtimes and service registries implementations do not cater to the versioning requirements of the components, service interfaces and business functionalities, as described above. These also do not enable composite application development based on specific business context, the QoS requirements, service interface versions and component implementation maturity levels. Further, these also do not enable compound versioning-based publish, find and bind of participating services in a composite application based on the factors mentioned above.

In light of the above discussion, there is need for a method, system and computer program product for an efficient versioning scheme for defining compound versions of the composite applications. In addition, such a method should enable the development of a composite application based on the requirements of the service interface, the business context, the QoS, the component implementation, and the software component.

SUMMARY

An object of the invention is to efficiently define a compound version for a service component.

Another object of the invention is to enable the identification of service components on the basis of user requirements to develop a composite application.

In order to achieve the objectives mentioned above, the present invention provides a method, a system and a computer program product to define a version identifier of a service component. The method includes determining a plurality of specification levels corresponding to the service component. Thereafter, each of the plurality of specification levels is integrated according to a predefined hierarchy. The version identifier of the service component includes the integrated specification levels.

The present invention also provides a method, a system and a computer program product to identify a set of service components from one or more service components. The set of service components is identified based on one or more user requirements corresponding to a set of predefined specification levels and a compound versioning scheme. The compound versioning scheme is defined based on the set of predefined specification levels and a predefined hierarchy.

The method, system and computer program product described above have various advantages. The method provides a comprehensive and efficient approach to defining versions of service components. It provides a comprehensive and contextual search of SCA components and composite applications meeting various functional and non-functional requirements such as service interfaces, software components, business functionality, business context and so forth. The method also provides an efficient filtering or search of existing catalog of SCA components used for building new composite applications based on SCA. Further, the method enables efficient management of version change and migration as well as co-existence of multiple versions catering to different functional and non-functional requirements. The method provides a versioning scheme based on the QoS and business context, thereby enabling parallel execution of service versions on the basis of these characteristics. Further, it also helps in saving service design time, since the existing services can be identified and reused based on their business context, functionality, and QoS. This also assists in avoiding replication of services. Further, the present invention enables identification and integration of service components based on the QoS and business contextual characteristics. Furthermore, it helps in improving the traceability of the service components by defining the version identifiers for them based on the user requirements corresponding to the plurality of specification levels. The present invention also enables the identification of service components on the basis of user requirements.

BRIEF DESCRIPTION OF DRAWINGS

The various embodiments of the invention will hereinafter be described in conjunction with the appended drawings, provided to illustrate and not to limit the invention, wherein like designations denote like elements, and in which.

DETAILED DESCRIPTION OF DRAWINGS

The invention describes a method, system and computer program product for defining a version of a service component. The invention also describes a method, system and computer program product for identifying a set of service components from one or more service components using the defined versions. A service component includes a configurable software component with a service interface which is developed for a particular business context and to provide specific business functionality. The set of service components are identified from the one or more service components based on user requirements and a compound versioning scheme.

Figure 1:
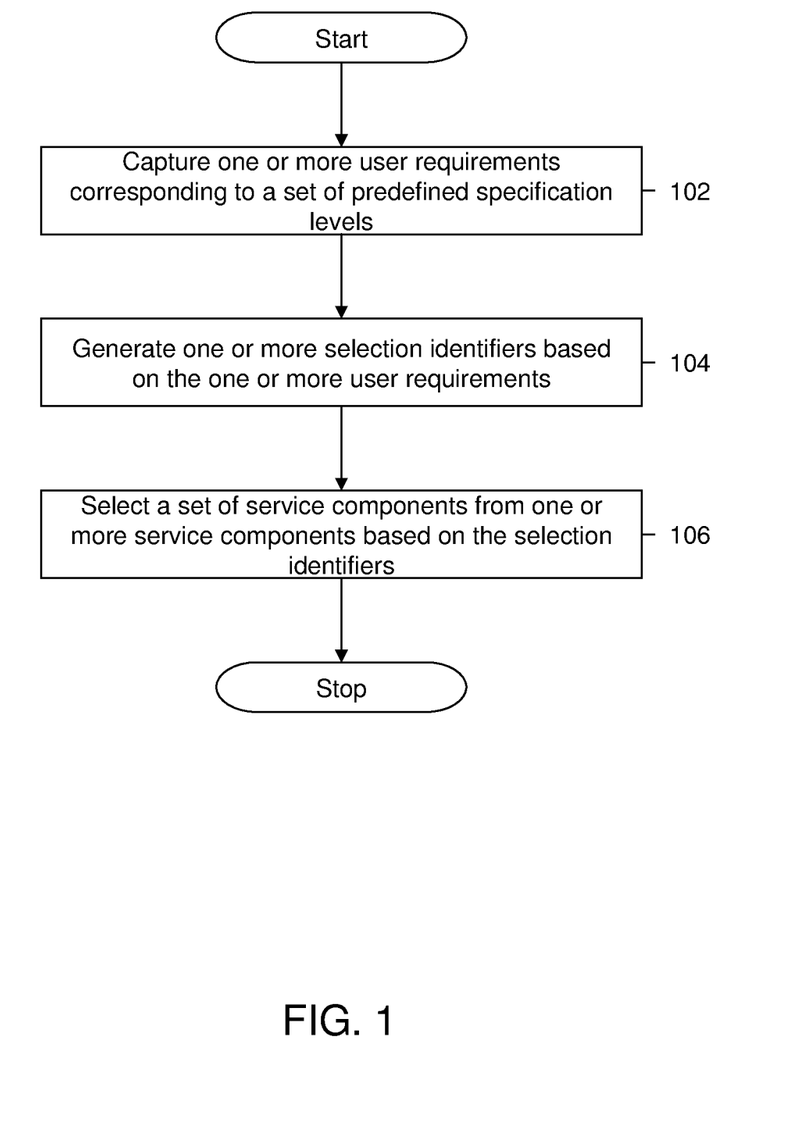
FIG. 1 illustrates a flowchart of a method for identifying a set of service components, in accordance with an embodiment of the invention.

FIG. 1 illustrates a flowchart of a method for identifying a set of service components, in accordance with an embodiment of the invention.

At step 102, one or more user requirements are captured. The user requirements correspond to a set of predefined specification levels. A specification level represents attributes and functionalities associated with a service component. The attributes and functionalities of the service component include, but are not limited to, a business functionality provided by the service component, its service interface, its service component configuration properties, a business context for which the service component is developed, Quality of Service (QoS) provided by the service component, specifications of its software component and so forth.

In an embodiment of the invention, the set of predefined specification levels includes a business functionality level, a service interface level, a service interface compatibility level, a configuration level, a business context level, a QoS level, and a software component level. The user requirements corresponding to one or more of these specification levels are captured. In an embodiment of the invention, the user requirements refer to the requirements specified by a business user or a person using the service component for various business requirements.

The business functionality level represents the business functionality provided by the service component. Examples of business functionality provided by a service component include, but are not limited to, making credit card payment, checking account balance and creating an Internet banking account. Further, the service component provides a business functionality belonging to various domains such as banking, health care management, automobiles, and so forth. The user requirements that are captured specify the required business functionality. For example, a user may specify a need for a service component to satisfy the credit card payment functionality.

The service interface level and the service interface compatibility level define the specifications of the service interface of the service component. The service interface is an interface of the service component used by a user to invoke and use the service component. The user can avail the services provided by the service component using the service interface. The user provides inputs and receives messages or output through the service interface. For example, files defined in Web Service Definition Language (WSDL), Interface Description Language (IDL), and so forth describe the service interface of the service components. The specifications of the service interface include technical details such as user input format, message output format, message protocol bindings, display, and so forth. A service component is compatible with various service interfaces. The compatibility of the service component with a service interface means that the service component implementation or the reusable piece of software code could be accessed by other such components through a compatible interface. In other words, the service component adheres to the contract defined in the service interface with which the service component is compatible. Further, the service component is directly compatible with some service interfaces and indirectly or backward compatible with some service interfaces. The service interface level defines the specifications of the one or more service interfaces with which the service component is directly compatible. Furthermore, the service interface compatibility level defines the specifications of the one or more service interfaces with which the service component is indirectly compatible. A service interface is said to be indirectly compatible with a service component if it is compatible with the service component after some computations such as message transformations, and so forth. Further, the service component is indirectly compatible with one or more predefined service interfaces. The user requirements corresponding to the two levels, i.e., the service interface level and the service interface compatibility level, correspond to the specifications of the service interface with which the service component is directly and indirectly compatible. For example, 'Get stock Quote' service component implementation provides as output real time stock values once the stock symbol is provided as the input. Now the component could be outputting the value as text value for example, string type in Java™, C++, and so forth and could expect a text value as input specifying the stock symbol. It can now be said that the service component is compatible with an interface which specifies both the input and output type as text and having the operation named as "getStockQuote". However, there could be another interface definition (or specification) which also is named 'getStockQuote' and is intended to provide same functionality but provides output as numbers for example, integer type in Java™, C++, and so forth instead of textual values. The 'Get Stock Quote' service component would be said to be compatible with the former service interface but not directly compatible with the latter. However, the output from the service component could be modified without much effort to provide output in same format as specified in the latter service interface specification. Hence there is compatibility with the latter service interface specification but an indirect one.

The configuration level represents the configuration properties of the service component. One or more properties of a service component are externally configurable. Examples of these properties include, but are not limited to, operational specifications, such as details of the database(s) used, the query language of the user, the geography in which the service component operates, the domain of the service component, and so forth. One or more components are used for the external configuration of the service components. The user requirements captured for this level correspond to the specifications of the components used for the external configuration of the service components. For example, Service Component Definition Language (SCDL) files in the SCA standard are the configuration files or the components used for external configuration of the service component.

The business context level specifies the business context for which the service component is developed. In other words, the business context represents the application area of the service component. For example, a service component developed for checking credit rating of a customer can be used for a retail customer, a corporate customer and so forth. Therefore, the business context of the service component can be retail customer, corporate customer, and so forth. The user requirements for the business context level specify the required application area. For example, a user needs a service component to check the credit rating of the retail customer only.

The QoS level represents the service quality provided by the service component. The service quality is determined based on one or more parameters such as performance of the service component, throughput time of the service component, latency while providing the service, reliability of the service component, response time of the service component, and so forth. The captured user requirements specify the QoS corresponding to the one or more parameters. For example, according to the user requirements, the service component should provide a high QoS level, wherein the QoS is estimated based on the throughput time of the service component.

The software component level represents the specifications of the software component, also referred to as software implementation component. A software component is a piece of executable software code which is used independently or in conglomeration with other software components. The specifications of the software component include the programming language used for developing the service component, the operating system on which the software component can be used, the methods and operations performed by the software component, and so forth. The captured user requirements correspond to the specifications of the required software component.

At step 104, one or more selection identifiers are generated on the basis of the one or more user requirements and a compound versioning scheme. The user requirements captured at step 102 correspond to the set of specification levels and are used for generating selection identifiers. Further, the compound versioning scheme is based on the set of predefined specification levels and a predefined hierarchy. In an embodiment of the invention, the predefined hierarchy includes the plurality of predefined specification levels defined in the following order: the business functionality level, the service interface compatibility level, the service interface level, the configuration level, the business context level, the QoS level, and the software component level. It will be evident to a person skilled in the art that the order of the specification levels in the predefined hierarchy can be changed.

In various embodiments of the invention, a version is defined corresponding to the specification levels. The version specifies a particular form or variant of the specification level used in the service component. Therefore, one or more versions of each of the specification levels are defined. For example, a software component developed in Visual Basic can have multiple versions depending on the version of Visual Basic being used. The version is specified or denoted using various formats such as alphabets, numerals or a combination of both. For example, a software component can have a version 1.1 or 1.1a. Similarly, a version is defined for each of the specification levels of the service component, i.e., the business functionality level, the service interface level, the service interface compatibility level, the configuration level, the business context level, the QoS level, and the software component level. The compound versioning scheme is based on defining a version for each of the specification levels.

The selection identifiers are generated using the versions of one or more of the specification levels. The user requirements specify the versions of the required specification levels. These versions are then arranged according to the predefined hierarchy to obtain a selection identifier. For example, a user needs a service component that provides a business functionality of checking account balance, is directly compatible with a version 1.3 of the service interface and also satisfies the business context of a 'general corporate customer'. Based on the specified user requirements, a selection identifier is generated as 101::#::1.3::#::4::#::#, where 101 represents the checking account balance business functionality, and 4 represents the business context of the 'general corporate customer'. The defined selection identifier indicates that the required business functionality level is 101, the service interface level has a version 1.3, the business context level is 4, and the remaining specification levels are specified as '#'. In an embodiment of the invention, '#' indicates that a default value of the version of the specification level values is used in the selection identifier. In another embodiment of the invention, '#' indicates that the value of the version of the particular specification level is null. It will be evident to a person skilled in the art that '#' represents a wild card which can have any available value(s) of the specification level. Further, the value of '#' is not constrained by the user requirements. Therefore, various selection identifiers can be generated by varying the value of '#' for the specification levels for which there are no inputs from the user. The selection identifiers thus generated are used for the identification of the service components.

At step 106, the set of service components is selected from the one or more service components stored in a repository. The selection of the service components is based on the selection identifiers generated at step 104. Each service component stored in the repository is associated with a version identifier. The version identifier is defined based on the compound versioning scheme, as explained in conjunction with the description of FIG. 2. The selection of the service components is performed by matching the selection identifiers with the version identifiers of the one or more service components stored in the repository. The identified set of service components includes those service components that have their version identifiers matching with each of the one or more selection identifiers.

In an embodiment of the invention, the identified service components are integrated to develop a composite application. The composite application includes at least one service component corresponding to each of the business functionalities required from the composite application. The service components are integrated based on their mutual compatibility. Two service components are said to be mutually compatible if output format of first service component matches with input format of second service component. The composite application is developed by connecting together different participating service components in an appropriate order. Two consecutive service components are connected only if output from the first component is acceptable as an input by the second component to which the first component is connected in the execution flow of the composite application. For example, a business process related to Purchase Order (PO) processing includes two consecutive steps. The first step includes searching for an existing PO based on customer account details. The output of the first step includes the details of the PO. Further, in the second step, the PO details are used to make amendments to the PO. The first step is implemented by a service component 'X' which accepts customer account ID as an input and generates the PO details in a particular format as an output. The PO details include information regarding different fields such as PO ID specified as a six digit number, PO description specified in plain text format with a maximum length of 200 characters and PO creation date in yyyy/mm/dd::hh:mm format. These PO details specified in the particular format should be accepted by a service component 'Y' implementing the second step. In case, the service component 'Y' takes input in the format provided by the service component 'X', then the two service components are said to be mutually compatible. However, if the service component 'Y' takes input in a format such as PO ID as a string of 10 characters, PO creation date in yy/mm/dd::hh format and so forth, then the output of the service component 'X' is not directly consumable by the service component 'Y'. Therefore, the two service components are said to be mutually incompatible.

In an embodiment of the invention, the identified service components are integrated using Service Component Architecture (SCA) concepts to develop the composite application.

The forthcoming section describes the identification of a set of service components, in accordance with an exemplary embodiment of the present invention. The service components are identified from one or more service components, based on one or more user requirements.

The following table illustrates one or more service components and the versions of their corresponding specification levels:

| Name | Business functionality level version | Service interface level version | Service interface compatibility level version | Service component configuration level version | Business context level version | QoS level version | Software component level version |
|---|---|---|---|---|---|---|---|
| SC1 | 101 | 1.3 | 1.5 | 0.9 | 4 | 5 | 1.5.4 |
| SC2 | 101 | 1.3 | 1.6 | 0.6 | 4 | 4 | 1.5.5 |
| SC3 | 101 | 1.2 | 1.5 | 0.8 | 4 | 2 | 1.6 |
| SC4 | 101 | 1.3 | 1.6 | 0.7 | 2 | 1 | 2.3 |
| SC5 | 102 | 3.6 | 3.8 | 0.7 | 2 | 1 | 1.5.4 |
| SC6 | 103 | 4.7 | 5.0 | 0.7 | 3 | 3 | 6.3 |

The information provided in the table above is interpreted as follows:
  101 represents the 'checkAccountBalance' business functionality, and 102 represents the 'checkCreditRating' business functionality, and 103 represents the 'getPermanentAddressDetails' business functionality.
  The service interface compatibility level indicates the versions of the service interface up to which the service component will be compatible due to the availability of built-in message transformations.
  2 represents the 'general retail customer' business context, 3 represents the 'preferred retail customer' business context, and 4 represents the 'general corporate customer' business context.
  A high QoS number indicates a low level of service. Therefore, a QoS number of 1 is better than QoS number 2.

Further, a set of service components needs to be identified from the service components mentioned above, based on the following user requirements:
  The business functionality provided is 'checkAccountBalance'.
  The service interface directly compatible with the service component is at a level 1.3.
  The business context is 'general corporate customer'.
  The QoS level of service component should be as high as possible.

The service components that are compatible with the user requirements mentioned above are SC1 and SC2. Further, the service component SC2 provides a higher QoS level than the service component SC1 and is therefore returned as a solution to the user. However, if the user requirements had been independent of the QoS level, both the service components, SC1 and SC2, would have been returned as the solution to the user.

Alternatively, the user requirements may correspond to the service components for the 'checkAccountBalance' functionality, and the service interface backward compatible with 1.4 version. Further, the service component should satisfy the business context 'general customer' irrespective of the fact that the customer is 'retail' or 'corporate'. Also, the user needs the highest possible QoS under the given circumstances. In this scenario, the service components SC1, SC2, SC3, and SC4, satisfy the user requirements mentioned above. However, the service component SC4 is selected since it has the highest QoS.

Figure 2:
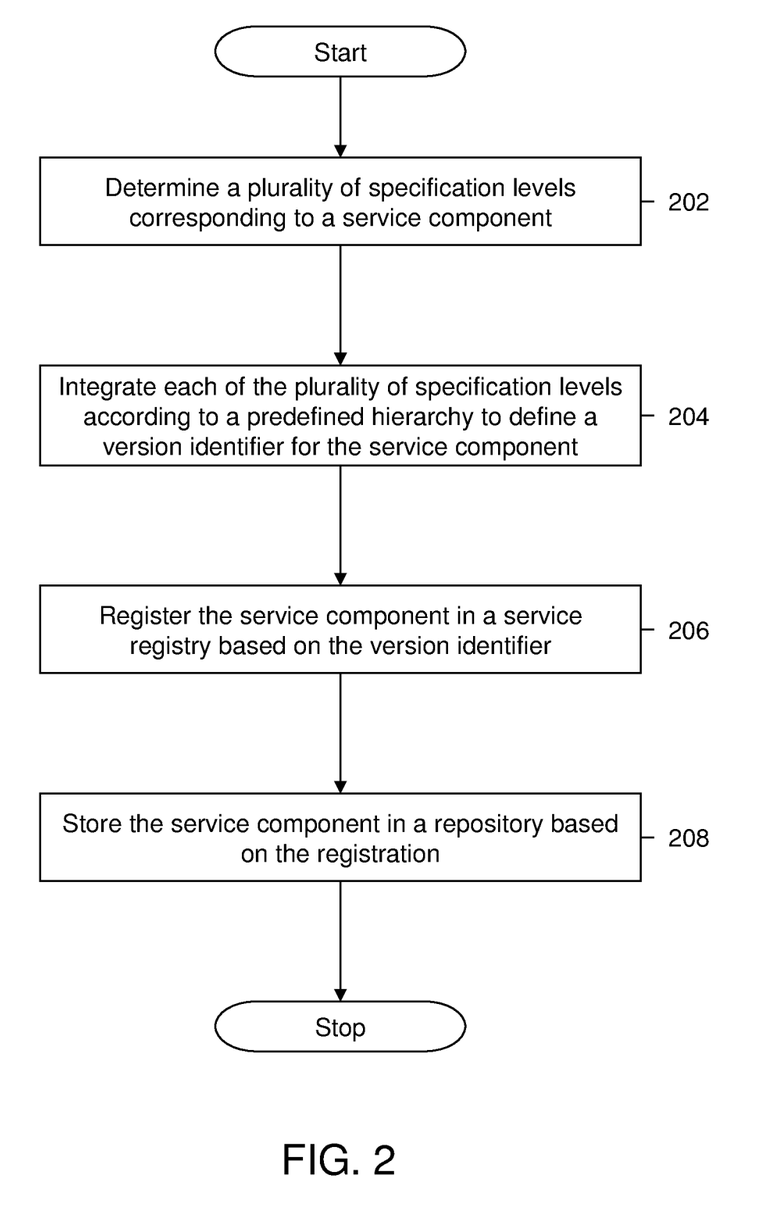
FIG. 2 illustrates a flowchart of a method for defining a version identifier of a service component, in accordance with an embodiment of the invention.

FIG. 2 illustrates a flowchart of a method for defining a version identifier of a service component, in accordance with an embodiment of the invention.

At step 202, a plurality of specification levels corresponding to a service component is determined. The plurality of specification levels includes a business functionality level, a service interface level, a service interface compatibility level, a configuration level, a business context level, a QoS level, and a software component level. Each of the plurality of specification levels has been described in detail in conjunction with the description of FIG. 1. A service component includes a configurable software component with a service interface. The service component provides specific business functionality for a specific business context. Further, the service component provides the specific business functionality at a certain QoS. For example, a service component includes a Java™ component providing the functionality of checking the balance of current accounts at a high QoS level.

In an embodiment of the invention, a version corresponding to each of the plurality of specification levels is determined at step 202. The version is represented using alphabets, numerals or a combination of both, as explained in conjunction with the description of FIG. 1. Each version corresponding to a specification level has a unique meaning. The version corresponding to the business functionality level indicates the business functionality provided by the service component. For example, business functionality level 101 indicates the business functionality of checking account balance. In an embodiment of the invention, the business functionality provided by the service component includes various levels and sub-levels. Each business functionality belongs to a particular domain, which is further divided into various levels and sub-levels. For example, the banking domain includes functionalities such as Internet banking, credit card payment, and so forth. The Internet banking facility further includes functionalities such as checking account balance, transferring money, and so forth. Each level and sub-level of the business functionality is represented by a unique alphabet or number in the version of the business functionality level. For example, in business functionality level 101 corresponding to checking account balance, the digit on the extreme left, i.e., 1 represents the banking domain, 0 represents Internet banking and the digit on the extreme right, i.e., 1 represents checking account balance functionality.

Similarly, the version corresponding to the service interface level defines or specifies the version of the service interface with which the service component is directly compatible. For example, a value of 1.5 of a service interface level for a service component indicates that the service component is directly compatible with 1.5 version of the service interface. It will be evident to a person skilled in the art that if a service component is compatible with a particular version of service interface, then the service component is also compatible with all prior versions of the service interface. For example, if a service interface has versions 1.0, 1.1, 1.2, and 1.3, and a service component is compatible with 1.2 version of the service interface, then the service component is also compatible with 1.0 and 1.1 versions of the service interface.

In an analogous manner, the version of the service interface compatibility level specifies the version of the one or more predefined service interfaces with which the service component is indirectly or backward compatible. For example, a value of 1.2 of a service interface compatibility level for a service component indicates that the service component is indirectly compatible with 1.2 version of the service interface. Further, the service interface compatibility level corresponds to the version of the service interface with which a service component can be made compatible after some computations such as message transformations and so forth. Furthermore, all prior versions of the service interface specified in the service interface compatibility level are either directly compatible with the service component or can be made compatible with the service component. For example, if a service component is directly compatible with version 1.2 and is indirectly compatible with version 1.6 of a service interface, then the service component is also indirectly compatible or can be made compatible with versions 1.3 to 1.5 of the service interface.

Similarly, the version of the configuration level is defined. The version of the configuration level corresponds to the version of the one or more components that are used for external configuration of the service component. For example, SCDL files in the SCA standard are the configuration files or the components used for external configuration of the service component. The SCDL files contain configuration information which can undergo changes and therefore the SCDL files can have different versions. Further, the business context of the service component is also specified as a version. For example, a service component can be used for retail customers as well as corporate customers. The distinction in such service components is made by using different versions of the business context. For example, the retail business context is indicated using a number, for example, 2 and the corporate business context is indicated using a different number, for example, 3.

The version corresponding to the QoS level specifies the quality of service offered by the service component. The QoS of a service component is determined on the basis of one or more parameters such as performance of the service component, throughput time of providing the service, latency while providing the service, reliability of the service, response time of the service component, and so forth. Further, the QoS is measured in terms of the value of the one or more parameters. In an embodiment of the invention, the QoS is measured as high, medium, and low. In another embodiment of the invention, the QoS is measured as gold grade, silver grade, and bronze grade. The QoS thus measured is represented using numerals, and so forth. For example, a value of 2 of the QoS level indicates a medium QoS or a silver grade QoS. Further, in an embodiment of the invention, each of the parameters for which the QoS is measured is also indicated in the QoS level. For example, a version 2a of the QoS level indicates a medium response time of the service component, whereas a version 2b indicates a medium reliability of the service component. Furthermore, the version corresponding to the software component level specifies or defines the specifications of the software component. The version of the software component depends on various factors such as the operating system, the programming language being used, and so forth. For example, a software component satisfying particular business functionality and using Microsoft® Word 2003 will have a different version from the same software component that is developed using Microsoft® Word 2007. The version of each of the specification levels is used for defining a version identifier of the service component. Further, the version identifier is defined using a compound versioning scheme based on the specification levels.

At step 204, each of the plurality of specification levels of the service component is integrated. The specification levels determined at step 202 are integrated according to a predefined hierarchy. In an embodiment of the invention, the predefined hierarchy includes the plurality of specification levels defined in the following order: the business functionality level, the service interface compatibility level, the service interface level, the component configuration level, the business context level, the QoS level, and the software component level. The predefined hierarchy has been explained in conjunction with the description of FIG. 1. The version identifier includes the integrated specification levels. For example, if the business functionality level is 103, the service interface level is 1.3, the service interface compatibility level is 1.5, the configuration level is 0.9, the business context level is 4, the QoS level is 5, and the software component level is 1.5.4, then the version identifier is 101:1.3::1.5::0.9::4::5::1::1.5.4. In an embodiment of the invention, the version identifier is defined in the following format: Level 1:: Level 2:: Level 3:: Level 4:: Level 5:: Level 6:: Level 7, where Level 1, Level 2, Level 3, Level 4, Level 5, Level 6 and Level 7 correspond to the various specification levels of the service component. In another embodiment, the version identifier is specified in the following format: (level 1; level 2; level 3; level 4; level 5; level 6; level 7). In yet another embodiment of the invention, the version identifier is specified in the following format: {(Level 1); (Level 2); (Level 3); (Level 4); (Level 5); (Level 6); (Level 7)}. In an embodiment of the invention, the version identifier is defined by a user.

At step 206, the service component is registered with a service registry based on its version identifier. The service registry includes a plurality of version identifiers corresponding to a plurality of service components. The registration of the service component includes storing the version identifier of the service component in the service registry. For example, a service component A developed for checking account balance and having a version identifier 101::1.3::1.8::203::4::gold::2.1 is stored in the service registry using its version identifier. In other, the version identifier of the service component is stored in the service registry.

In an embodiment of the invention, the service registry is an organization-specific service registry, i.e., each organization has its own service registry containing the version identifiers of its service components. In another embodiment of the invention, the service registry is compliant with the Universal Description Discovery and Integration (UDDI) standard.

At step 208, the service component is stored in the repository. The repository includes a plurality of service components. The service component is stored in the repository on the basis of its registration information stored in the service registry. The repository includes a plurality of service components defined for various business functionalities. Each service component is registered in the service registry and then it is stored in the repository. Therefore, each service component associated with its version identifier listed at the service registry is stored in the repository.

In an embodiment of the invention, the versioning of service components is used for identifying service components. The service components are identified based on one or more user requirements corresponding to the plurality of specification levels and the plurality of version identifiers associated with the service components stored in the repository. The identification of the set of service components has been described in detail in conjunction with the description of FIG. 1.

Figure 3:
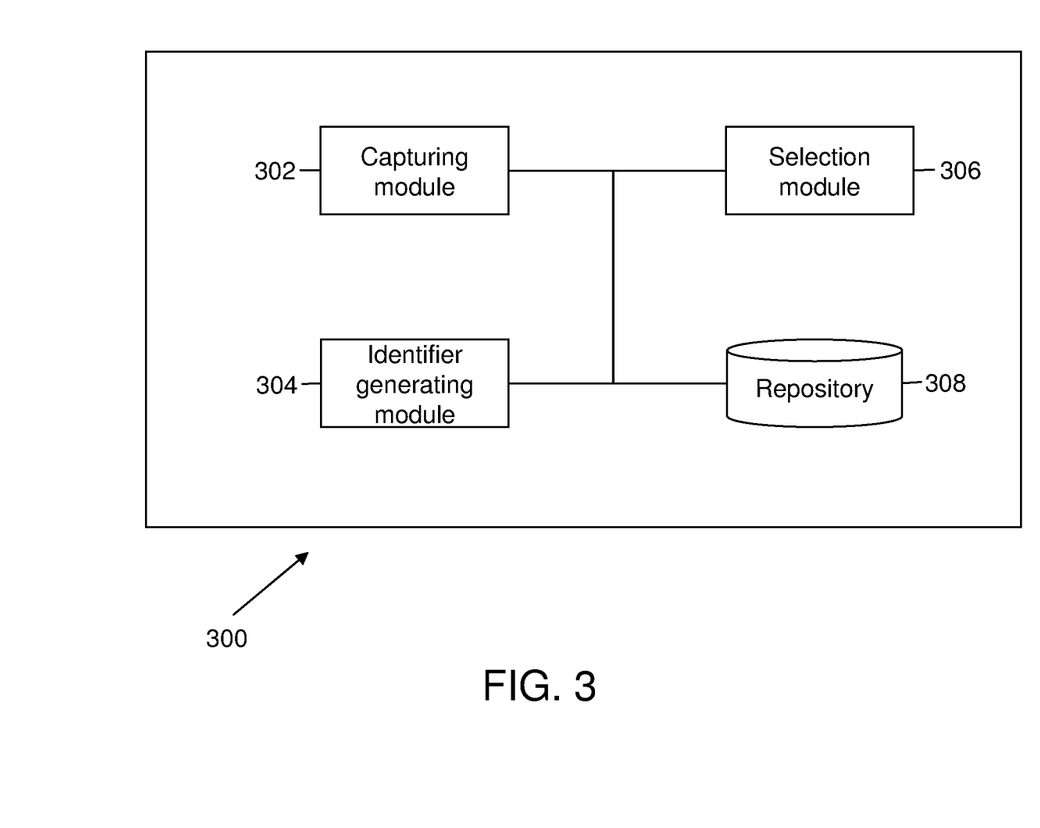
FIG. 3 illustrates a block diagram of a system for identifying a set of service components, in accordance with an embodiment of the invention.

FIG. 3 illustrates a block diagram of a system 300 for identifying a set of service components, in accordance with an embodiment of the invention. System 300 includes a capturing module 302, an identifier generating module 304, a selection module 306, and a repository 308.

Capturing module 302 is configured for capturing one or more user requirements for the set of service components. The user requirements correspond to a set of predefined specification levels. In an embodiment of the invention, the set of predefined specification levels includes a business functionality level, a service interface level, a service interface compatibility level, a configuration level, a business context level, a QoS level, and a software component level. The predefined specification levels and the capturing of the user requirements corresponding to the specification levels has been explained in detail in conjunction with the description of FIG. 1 and FIG. 2.

Identifier generating module 304 is configured for generating one or more selection identifiers based on the captured user requirements. The generation of the selection identifiers is also based on a compound versioning scheme explained in conjunction with the description of FIG. 1 and FIG. 2. The selection identifiers thus generated are used for identifying the set of service components from one or more service components. The generation of selection identifiers based on the captured user requirements and the compound versioning scheme has been explained in detail in conjunction with the description of FIG. 1.

Selection module 306 is configured for selecting the set of service components from the one or more service components. Each of the one or more service components is stored in repository 308. The set of service components is selected based on the captured user requirements and the compound versioning scheme. The compound versioning scheme corresponds to the one or more service components and is based on a predefined hierarchy and the set of specification levels. The selection of the set of service components has been explained in detail in conjunction with the description of FIG. 1.

The set of service components is identified by using the selection identifiers generated on the basis of the one or more user requirements and the compound versioning scheme. Each of the one or more service components stored in repository 308 is associated with a version identifier. The version identifier is defined based on the compound versioning scheme as explained in conjunction with the description of FIG. 2. The identification is performed by matching the selection identifiers to the version identifiers of the one or more service components. The service components that are stored in repository 308 and have their version identifiers similar to the selection identifiers are finally identified from repository 308. In an embodiment of the invention, the set of service components thus identified from repository 308 are used for developing a composite application, as explained in conjunction with the description of FIG. 1.

Figure 4:
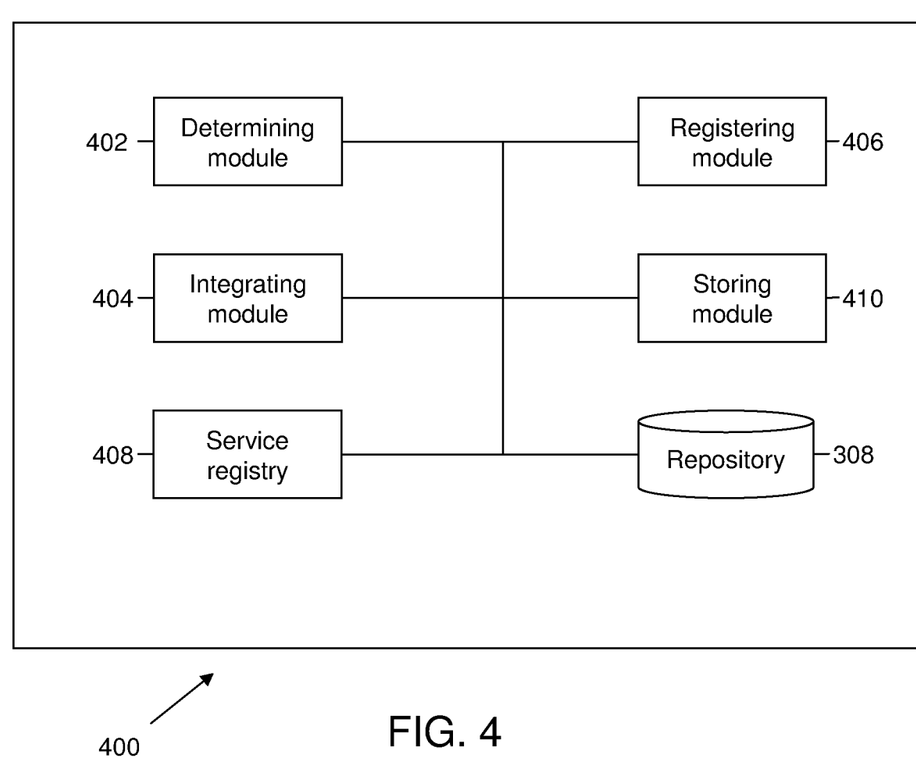
FIG. 4 illustrates a block diagram of a system for defining a version identifier of one or more service components, in accordance with an embodiment of the invention.

FIG. 4 illustrates a block diagram of a system 400 for defining a version identifier for one or more service components, in accordance with an embodiment of the invention. System 400 includes a determining module 402, an integrating module 404, a registering module 406, a service registry 408, a storing module 410, and repository 308.

Determining module 402 is configured for determining a plurality of specification levels corresponding to a service component. The plurality of specification levels include a business functionality level, a service interface level, a service interface compatibility level, a configuration level, a business context level, a QoS level, and a software component level. Each of the plurality of specification levels has been described in detail in conjunction with the description of FIG. 1 and FIG. 2.

Integrating module 404 is configured for integrating the plurality of specification levels determined for the service component. The specification levels are integrated according to a predefined hierarchy. In an embodiment of the invention, the predefined hierarchy includes the plurality of specification levels defined or arranged in the following order: the business functionality level, the service interface compatibility level, the service interface level, the component configuration level, the business context level, the QoS level, and the software component level. The version identifier of the service component includes the plurality of specification levels corresponding to the service component that are integrated according to the predefined hierarchy. The integration of the plurality of specification levels has been described in detail in conjunction with the description of FIG. 2.

Registering module 406 is configured for registering the service component in service registry 408. Registering module 406 registers the service component based on its version identifier. The version identifier of a service component has been explained in detail in conjunction with the description of FIG. 2. Each service component is registered with service registry 408 based on its version identifier. In other words, service registry 408 stores the version identifier of each of the one or more service components. For example, a service component X for checking account balance and having a version identifier 101::1.3::1.8::203::4::gold::2.1 is registered with service registry 408 based on its version identifier. In an embodiment of the invention, service registry 408 is an organization-specific service registry.

Storing module 410 stores the service component in repository 308. The service component is stored in repository 308 based on its registration information. Each service component registered in service registry 408 is stored in repository 308. Therefore, each of the one or more service components stored in repository 308 is associated with a version identifier stored in service registry 408. Repository 308 includes a plurality of service components defined for various business functionalities.

In an embodiment of the invention, system 400 includes an identification module configured for identifying a set of service components from the plurality of service components. The set of service components is identified based on the one or more user requirements corresponding to the plurality of specification levels, and a plurality of version identifiers corresponding to the plurality of service components stored in repository 308. The identification of the service components has been explained in detail in conjunction with the description of FIG. 1.

The method, system and computer program product described above have various advantages. The method provides a comprehensive and efficient approach to defining versions of service components. It provides a comprehensive and contextual search of SCA components and composite applications meeting various functional and non-functional requirements such as service interfaces, software components, business functionality, business context and so forth. The method also provides an efficient filtering or search of existing catalog of SCA components used for building new composite applications based on SCA. Further, the method enables efficient management of version change and migration as well as co-existence of multiple versions catering to different functional and non-functional requirements. The method provides a versioning scheme based on the QoS and business context, thereby enabling parallel execution of service versions on the basis of these characteristics. Further, it also helps in saving service design time, since the existing services can be identified and reused based on their business context, functionality, and QoS. This also assists in avoiding replication of services. Further, the present invention enables identification and integration of service components based on the QoS and business contextual characteristics. Furthermore, it helps in improving the traceability of the service components by defining the version identifiers for them based on the user requirements corresponding to the plurality of specification levels. The present invention also enables the identification of service components on the basis of user requirements.

The system for defining a version identifier of a service component and the system for identifying a set of service components, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for defining a version identifier of a service component and for identifying a set of service components. The computer program product includes a computer usable medium having a set program instructions comprising a program code for defining a version identifier of a service component and for identifying a set of service components. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

What is claimed is:

1. A method for defining a version identifier of a service component, the method comprising:
   a. determining a plurality of specification levels corresponding to the service component, the plurality of specification levels comprising:
      i. a business functionality level corresponding to a business functionality associated with the service component;
      ii. a service interface level corresponding to a service interface of the service component;
      iii. a service interface compatibility level corresponding to compatibility of the service component with one or more predefined service interfaces;

iv. a configuration level corresponding to one or more components used for external configuration of the service component;
v. a business context level corresponding to a business context associated with the service component;
vi. a quality of service level corresponding to a quality of service provided by the service component; and
vii. a software component level corresponding to a software implementation component of the service component; and b. integrating each of the plurality of specification levels according to a predefined hierarchy, the version identifier comprising the integrated specification levels;
c. registering the service component in a service registry based on the version identifier, the service registry comprising a plurality of version identifiers corresponding to a plurality of service components; and
d. storing the service component in a repository based on the registration, the repository comprising the plurality of service components.

2. The method of claim 1 further comprising identifying a set of service components from the plurality of service components, the set of service components being identified based on one or more user requirements and the plurality of version identifiers.

3. The method of claim 1, wherein the version identifier is defined by a user.

4. A non-transitory system for defining a version identifier of one or more service components, the system comprising:
   a. a determining module, the determining module configured for determining a plurality of specification levels corresponding to a service component, the service component being one of the one or more service components, the plurality of specification levels comprising:
      i. a business functionality level corresponding to a business functionality associated with the service component;
      ii. a service interface level corresponding to a service interface of the service component;
      iii. a service interface compatibility level corresponding to compatibility of the service component with one or more predefined service interfaces;
      iv. a configuration level corresponding to one or more components used for external configuration of the service component;
      v. a business context level corresponding to a business context associated with the service component;
      vi. a quality of service level corresponding to a quality of service provided by the service component; and
      vii. a software component level corresponding to a software implementation component of the service component; and
   b. an integrating module, the integrating module configured for integrating each of the plurality of specification levels according to a predefined hierarchy, the version identifier comprising the integrated specification levels;
   c. a registering module, the registering module configured for registering the service component in a service registry based on the version identifier, the service registry comprising a plurality of version identifiers corresponding to a plurality of service components; and
   d. a storing module, the storing module configured for storing the service component in a repository based on the registration, the repository comprising the plurality of service components.

5. The non-transitory system of claim 4 further comprising an identification module, the identification module configured for identifying a set of service components from the plurality of service components, the set of service components being identified based on one or more user requirements and the plurality of version identifiers.

6. The non-transitory system of claim 4, wherein the version identifier is defined by a user.

7. A non-transitory computer program product for use with a stored program computer, the computer program product comprising a computer usable medium having a computer readable program code embodied therein for defining a version identifier of a service component, the computer readable program code performing:
   a. determining a plurality of specification levels corresponding to the service component, the plurality of specification levels comprising:
      i. a business functionality level corresponding to a business functionality associated with the service component;
      ii. a service interface level corresponding to a service interface of the service component;
      iii. a service interface compatibility level corresponding to compatibility of the service component with one or more predefined service interfaces;
      iv. a configuration level corresponding to one or more components used for external configuration of the service component;
      v. a business context level corresponding to a business context associated with the service component;
      vi. a quality of service level corresponding to a quality of service provided by the service component; and
      vii. a software component level corresponding to a software implementation component of the service component; and
   b. integrating each of the plurality of specification levels according to a predefined hierarchy, the version identifier comprising the integrated specification levels;
   c. registering the service component in a service registry based on the version identifier, the service registry comprising a plurality of version identifiers corresponding to a plurality of service components; and
   d. storing the service component in a repository based on the registration, the repository comprising the plurality of service components.

8. The non-transitory computer program product of claim 7, wherein the computer readable program code further performs identifying a set of service components from the plurality of service components, the set of service components being identified based on one or more user requirements and the plurality of version identifiers.

* * * * *